US009112756B1

(12) United States Patent
Fleizach et al.

(10) Patent No.: US 9,112,756 B1
(45) Date of Patent: Aug. 18, 2015

(54) SYSTEM AND METHOD FOR COHERENT WIDEBAND CHANNEL GENERATION USING MULTIPLE RECEIVED NARROWBAND CHANNELS

(71) Applicant: The United States of America as represented by the Secretary of the Navy, Washington, DC (US)

(72) Inventors: Gregory K. Fleizach, San Diego, CA (US); Gary Lau, Poway, CA (US); Ralph W. Hunt, San Marcos, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 14/209,672

(22) Filed: Mar. 13, 2014

(51) Int. Cl.
*H03H 7/30* (2006.01)
*H03H 7/40* (2006.01)
*H03K 5/159* (2006.01)
*H04L 27/26* (2006.01)
*H04L 25/02* (2006.01)
*H04L 27/01* (2006.01)

(52) U.S. Cl.
CPC ........ *H04L 27/2602* (2013.01); *H04L 25/0204* (2013.01); *H04L 27/01* (2013.01)

(58) Field of Classification Search
CPC .................................................... H04L 25/0319
USPC .......................................................... 375/232
See application file for complete search history.

(56) References Cited

U.S. PATENT DOCUMENTS

| 3,701,154 A * | 10/1972 | McKinney ...................... 342/16 |
| 4,622,519 A | 11/1986 | Goldman |
| 7,986,736 B2 | 7/2011 | Nguyen et al. |
| 2007/0110198 A1* | 5/2007 | Skarby et al. ................. 375/349 |
| 2014/0105256 A1* | 4/2014 | Hanevich et al. ............. 375/219 |

* cited by examiner

*Primary Examiner* — Tanmay Shah
(74) *Attorney, Agent, or Firm* — SPAWAR Systems Center Pacific; Kyle Eppele; Ryan J. Friedl (57) ABSTRACT

A system and method involve channelizing a received signal into two or more narrowband channels, each narrowband channel having an overlapping frequency portion, creating matched narrowband channels by matching the unknown amplitude, phase, and delay of at least two of the narrowband channels, coherently summing the matched narrowband channels into a wideband channel, and equalizing the wideband channel using an equalizing filter to generate a coherent wideband channel.

19 Claims, 8 Drawing Sheets

SYSTEM AND METHOD FOR COHERENT WIDEBAND CHANNEL GENERATION USING MULTIPLE RECEIVED NARROWBAND CHANNELS

FEDERALLY SPONSORED RESEARCH AND DEVELOPMENT

The System and Method for Coherent Wideband Channel Generation Using Multiple Received Narrowband Channels is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102144.

BACKGROUND

Generation of a wideband communications channel is desirable in many applications. One method to generate such as signal involves using a wideband receiver. However, wideband receivers can be expensive and inflexible. As an alternative to a wideband channel, selection of a single channel from many channels based on various metrics has been used, but this does not provide the fidelity of a single, coherent wideband channel. Another method involves requiring that two channels to be combined have coherent references or be driven by the same oscillator, which may not be flexible enough for certain applications.

DETAILED DESCRIPTION OF SOME EMBODIMENTS

The embodiments of the system and method disclosed herein provide generation of a coherent wideband channel by combining narrower channels from separate receivers attached to the same antenna. The delay, phase, and amplitude are matched between two or more channels, which are then coherently summed to provide a single wideband channel output. Such capability is useful when having a single wideband receiver is too expensive or too inflexible for the intended system. The disclosed system and method provide the flexibility of multiple receiver channels with the ability to generate a single wideband channel when needed. As an example, a single field-programmable gate array (FPGA) or small application-specific integrated circuit (ASIC) may be used to complete the processing in real-time. The receivers may have arbitrary, unknown phases. The system and method may be incorporated into fielded systems with multiple channels that originally did not require a wideband capability.

Figure 1:
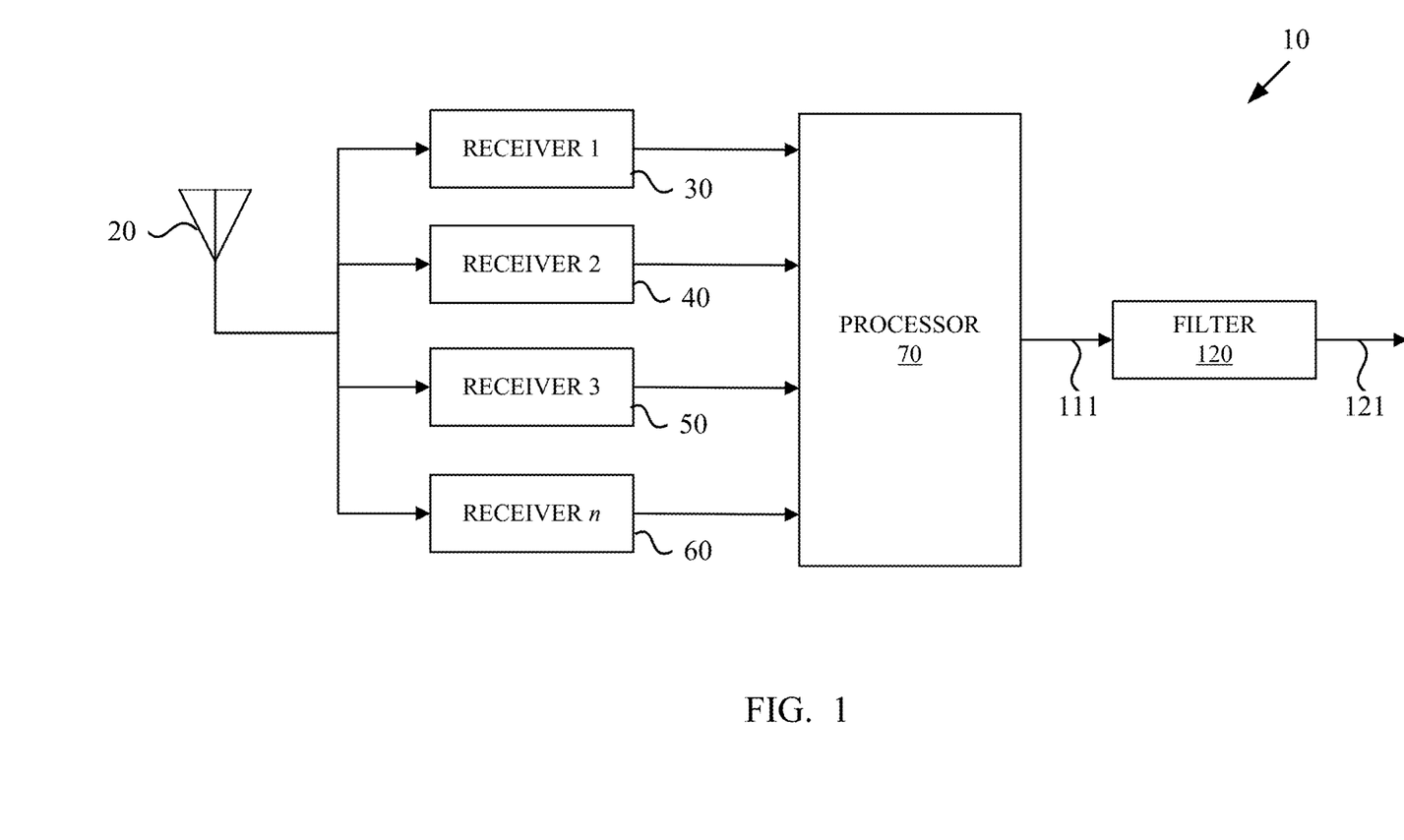
FIG. 1 shows a block diagram of a system in accordance with the System and Method for Coherent Wideband Channel Generation Using Multiple Received Narrowband Channels.

FIG. 1 shows a block diagram of a system 10 in accordance with the System and Method for Coherent Wideband Channel Generation Using Multiple Received Narrowband Channels. A signal is received by antenna 20 and is channelized into n narrowband channels through n receivers 30, 40, 50, and 60. The output of the receivers is received by processor 70. Processor 70 is configured to create matched narrowband channels by matching the amplitude, phase, and delay of at least two of the narrowband channels, as well as to coherently sum the matched narrowband channels into a wideband channel 111, which is then passed to filter 120. Filter 120 is configured to equalize the wideband channel and produce an equalized wideband channel 121.

As an example, a narrowband channel for radio communications may have a bandwidth between 30 Hz and 25 kHz. However, narrower or wider channel bandwidths may be used for each narrowband channel. The term "narrowband" may refer to a channel that is sufficiently narrow that its spectrum is flat, i.e., smaller than the coherence bandwidth of the channel. A wideband channel is defined similarly to a narrowband channel, but its bandwidth is greater than the coherence bandwidth of the channel. Further, a wideband channel may result from a combination of two or more narrowband channels. In one example, a channel width of two times the width of a narrowband channel may generally be considered to be a wideband channel relative to the narrowband channel.

Figure 2:
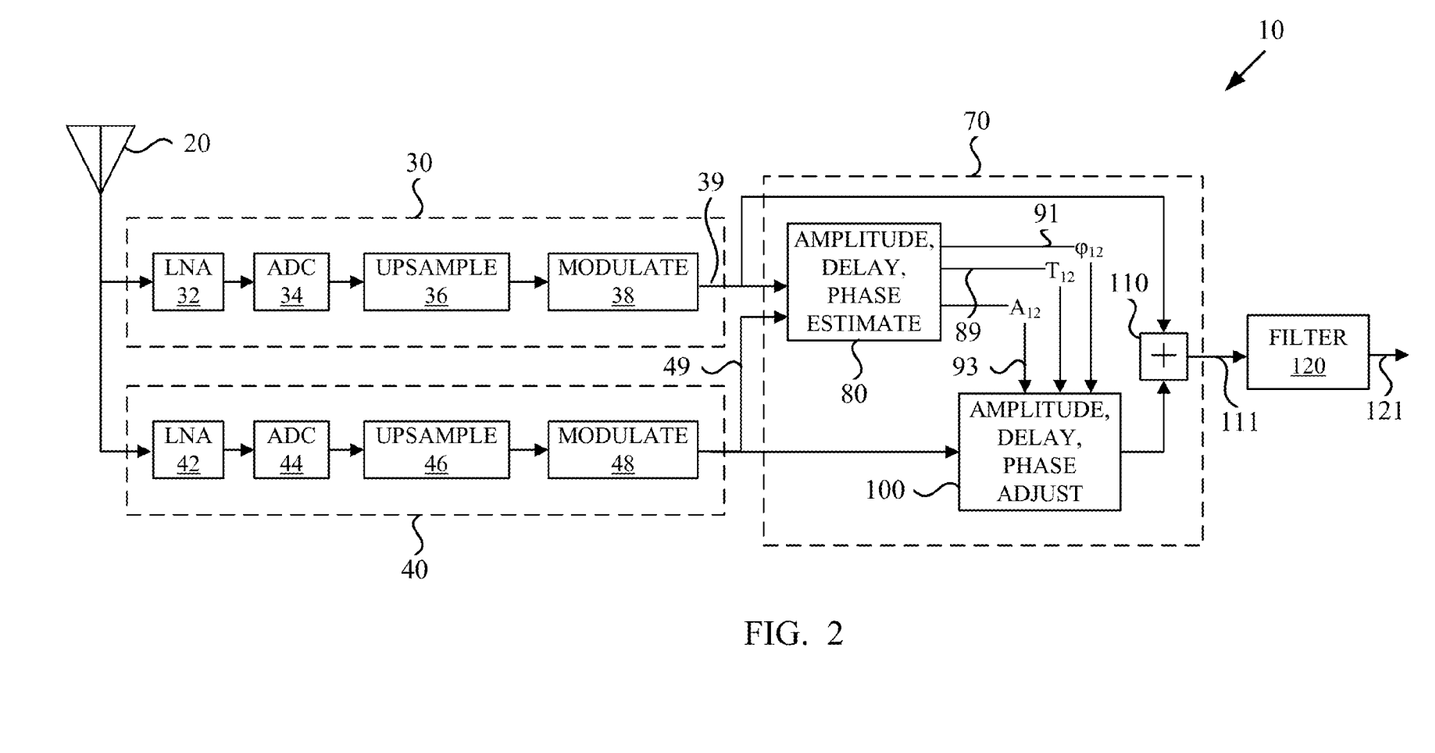
FIG. 2 shows a detailed block diagram of the system shown in FIG. 1, for a two channel system.

FIG. 2 shows a detailed block diagram of the processing architecture for a system 10 using two narrowband channels. While FIG. 2 only shows processing for two narrowband channels, system 10 is not limited thereto and may be configured to combine additional narrowband channels into a single coherent wideband channel.

A signal is received by antenna 20 and is split between two narrowband channels via receivers 30 and 40. Receiver 30 comprises a low-noise amplifier (LNA) 32, an analog-to-digital converter (ADC) 34, upsampling circuitry 36, and modulation circuitry 38. Receiver 40 is similarly configured, comprising LNA 42, ADC 44, upsampling circuitry 46, and modulation circuitry 48. In some embodiments, a single LNA may be used after antenna 20 instead of an individual LNA for each channel. RF front ends are used to select the desired center frequency and then ADCs 34 and 44 are used to convert the signal from analog to digital.

In order to combine the narrowband channels, they must have an overlapping frequency portion. For example, if the individual narrowband channel bandwidths are each 10 MHz and the required overlap bandwidth is 2 MHz, then the two narrowband channels might be tuned to, for example, 96 MHz and 104 MHz. The amount of bandwidth to overlap the two narrowband channels depends on how long the two narrowband channels can be integrated together and the signal-to-noise ratio (SNR), which is determined by the receiver chain 30 and 40.

Once the overlapped narrowband channels have been digitized, each narrowband channel is upsampled by circuitry 36 and 46 by a factor of two in this two channel example. This oversampling factor is dependent on the width of the wideband output channel. For example, if three input channels were combined the upsampling factor would be about three. The channels do not have to be upsampled by an integer number, but can be interpolated by any rational factor by upsampling and then downsampling.

Next, the data is frequency modulated by circuitry 38 and 48 in the appropriate direction because, in the example of the two channels tuned to 96 MHz and 104 MHz, each channel has been centered to baseband. Thus, the 2 MHz overlap region may be found at 3 MHz to 5 MHz for the 96 MHz channel and at −5 MHz to −3 MHz for the 104 MHz channel. Accordingly, the former channel is modulated down to −4 MHz and the latter channel is modulated up to 4 MHz. Now each channel covers the overlap region from −1 MHz to 1 MHz, as desired. In this example, the output channel will have a bandwidth of 18 MHz from −9 MHz to 9 MHz.

In some embodiments, the data in each narrowband channel comprises time domain data and frequency modulating the time domain data occurs by multiplying the time domain data with a complex exponential with one of increasing phase or decreasing phase determined by a phase accumulator. In some embodiments, the data in each narrowband channel comprises frequency domain data and frequency modulating data in each narrowband channel comprises circularly shifting the frequency domain data. After frequency modulation, the spectra of the two channels might look something like that shown in graph 100 of FIG. 3.

Figure 4:
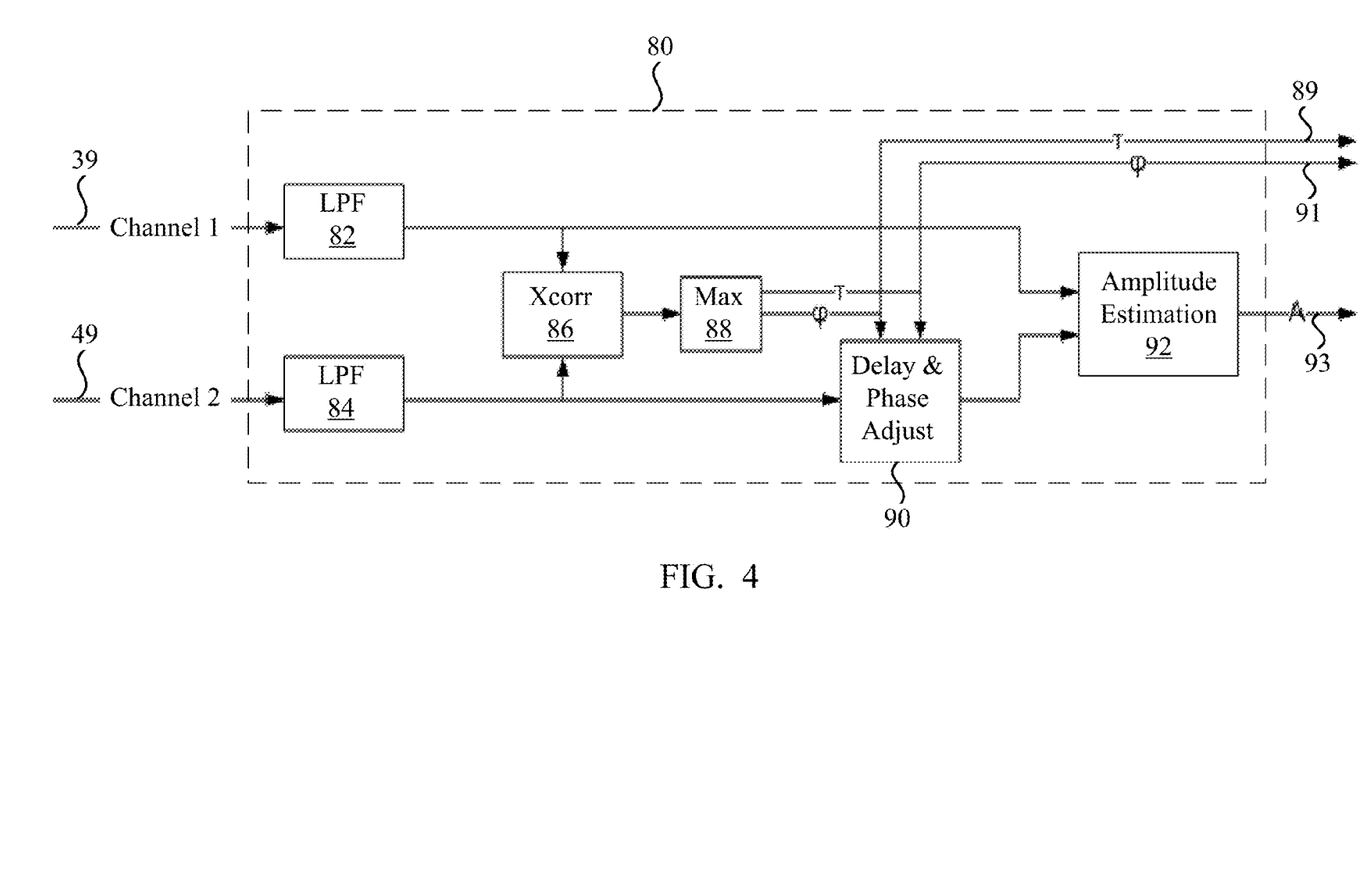
FIG. 4 shows a block diagram of an embodiment of amplitude, delay, and phase estimation circuitry for the system shown in FIG. 2.

The amplitude, delay, and phase differences between the channels can now be estimated. Receiver 30 outputs signal 39 and receiver 40 outputs signal 49 to amplitude, delay, and phase estimate circuitry 80 contained within processor 70. Output from receiver 40 is also received by amplitude, delay, and phase adjustment circuitry 100 also contained within processor 70. As shown in FIG. 4, estimation is accomplished by cross-correlating the data from the channels in the overlapped portion of the spectrum. Since signals 39 and 49 originated from the same antenna 20, they will have the same signal in the overlapped bandwidth. The signal in the overlapped bandwidth may be thermal noise generated in antenna 20, unknown signals, or known signals. It does not matter that the input be known or even what it is because it will be the same in the overlap region in each channel.

To estimate the difference in channel parameters, the data from each channel is first digitally low-pass filtered by filters 82 and 84, as shown in FIG. 4, to exclude the non-overlapped portions of the spectra as they will only add noise to the estimation procedure. The low-pass filtered data from both channels is cross-correlated by cross-correlation circuitry 86 and the maximum of the cross-correlation is determined by cross-correlation maximum circuitry 88.

The length of signal to cross-correlate from each channel depends on the SNR of the receiver chain (i.e., signal incident on the antenna to receiver noise) and the amount of overlap bandwidth. The higher the SNR, the less time the signal must be integrated. Likewise, the greater the overlap bandwidth, the less time the signal must be integrated. The required length of cross-correlation can be determined theoretically or heuristically based on how coherent the wideband output channel must be. The cross-correlation length may also be dependent on processing considerations such as latency and algorithm size in hardware. In some embodiments, a full cross-correlation (i.e., across all possible time shifts) may not be necessary if the delay between the two channels is known to be within some bounds (e.g., ±4 samples). Either of the channels being compared can be adjusted to match the other. That is, either channel may be considered the reference channel.

The offset of the maximum of the cross-correlation is the time delay τ and the phase of the maximum is the phase offset ϕ. These estimates can be used to correct one of the channels (channel 2 correction shown, but it is arbitrary) via delay and phase adjustment circuitry 90. The phase adjustment can be realized with a multiplication by a complex constant. The delay adjustment can be realized by either delay elements or multiplication in the frequency domain if a higher resolution is desired. Then, the amplitude difference is estimated using amplitude estimation circuitry 92. The amplitude difference between the channels is estimated by breaking the data from each channel that was cross-correlated into, for example, five overlapping segments. A modified variance calculation is used to estimate the variance of each channel for all segments. The amplitude difference in each section is calculated as $$\text{gain\_diff}_i = \frac{\text{sum}[\text{abs}(r1_{i,lpf}) - \text{mean}(r1_{i,lpf})]}{\text{sum}[\text{abs}(r2_{i,lpf}) - \text{mean}(r2_{i,lpf})]}, \ i = 0, 1, 2, 3, 4 \quad \text{(Eq. 1)}$$

where r1 is the data from the first channel, r2 is the data from the second channel, and i is the segment number denoting adjacent and non-overlapping segments of data. Thus, five gain differences will be calculated, one for each segment of data.

After the gain differences are calculated for each of the five segments, the median value of the five is chosen as the gain difference. This method of estimating the amplitude difference ensures that a signal captured in one channel, but not the another (e.g., from a linear frequency modulated signal) will not skew the estimation too heavily. The gain adjustment can be limited so as to avoid outliers causing a drastic amplitude change. For example, if the channels are known to be within 3 dB of one another, the gain difference can be limited so as to not exceed these minimum or maximum thresholds. In some embodiments, the channels do not have to be corrected in phase and delay prior to amplitude estimates as shown in FIG. 4, but it will provide a slightly better result.

After the delay, phase, and amplitude have been estimated they are used to correct one of the channels. In some embodiments, the adjustment involves adjusting the phase and amplitude of one of the narrowband channels. In some embodiments, the adjustment involves adjusting one of the phase, delay, and amplitude of one of the narrowband channels. However, it is possible to adjust both channels as well. Amplitude, delay, and phase estimation circuitry 80 provides signals $T_{12}$ 89, $\phi_{12}$ 91, and $A_{12}$ 93 to amplitude, delay, and phase adjustment circuitry 100 as shown in FIG. 2.

In FIG. 2, the second channel is adjusted in phase, delay, and amplitude. The delay adjustment can be achieved by delaying one channel or the other depending on whether the cross-correlation result gives a positive or negative lag. The phase adjustment is accomplished, for example, by multiplying the second channel by a constant complex exponential value. It is this correction that allows the two receivers 30 and 40 to not be phase-locked to one another. As long as the phase offset is constant, it can be corrected in this stage. Or, if the phase offset varies slowly, the delay, phase, and amplitude adjustments can be calculated periodically to align the channels. The amplitude adjustment is applied by, for example, multiplying the second channel by a constant gain factor.

Figure 3:
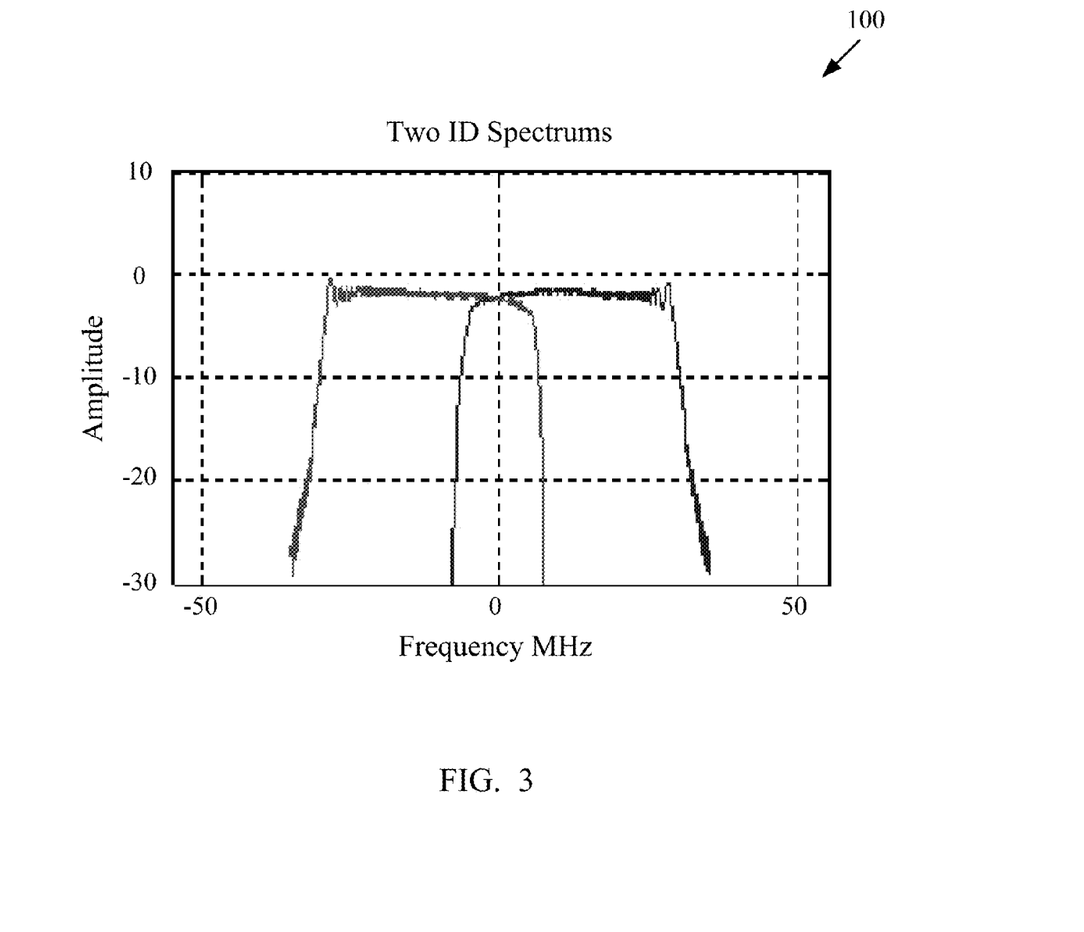
FIG. 3 shows a graph illustrating exemplary spectra of two overlapping channels after frequency modulation.
Figure 5:
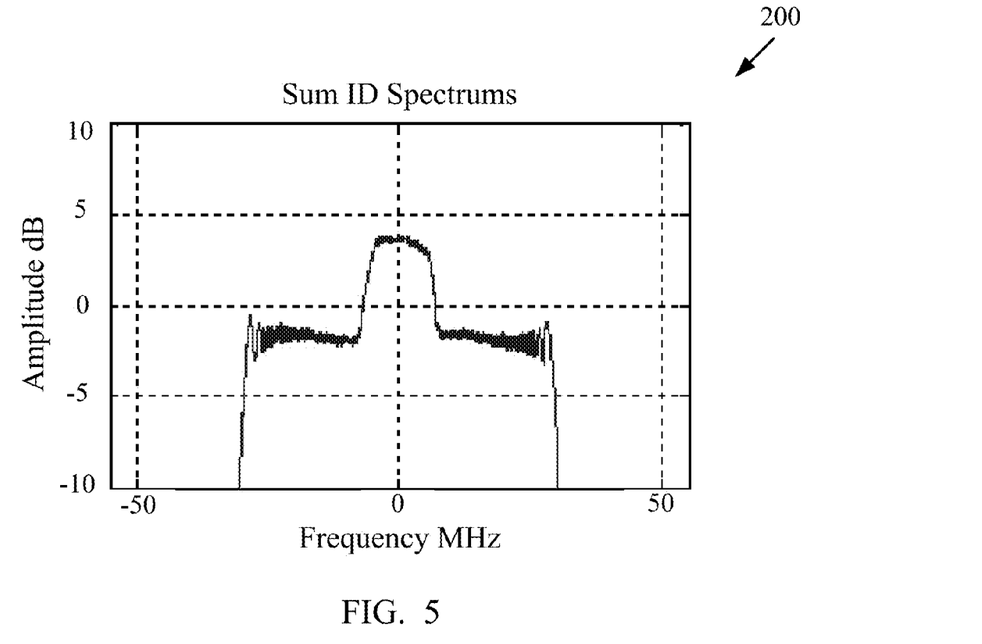
FIG. 5 shows a graph illustrating exemplary spectra of two coherently summed channels after an alignment in delay, phase and amplitude.

Once the two channels have been aligned in delay, phase, and amplitude, they can be coherently summed by summer 110 to produce a wideband channel 111. Summer 110 may be configured to add the I/Q data from each channel together sample by sample. The result might look like graph 200 shown in FIG. 5. Note that there is a hump where the two spectra of FIG. 3 overlapped. This provides validation that the channels have been adjusted and summed correctly. If the delay or phase estimates are incorrect, the hump may be heavily skewed or become a deep null. If the amplitude difference estimate is incorrect, there may be a distinct difference between the power levels left and right of the hump, where the ideal would be a flat spectrum. The peak of the hump will be about 6 dB above the nominal spectrum level because the two channels have been summed in voltage (or doubled), which produces a 4× (6 dB) increase in power since power is proportional to voltage squared. The reason the peak is not quite 6 dB in FIG. 5 is that, as FIG. 3 shows, the two channels may start to roll of in the overlap region so the power is not the same as across the rest of the spectrum.

Figure 6:
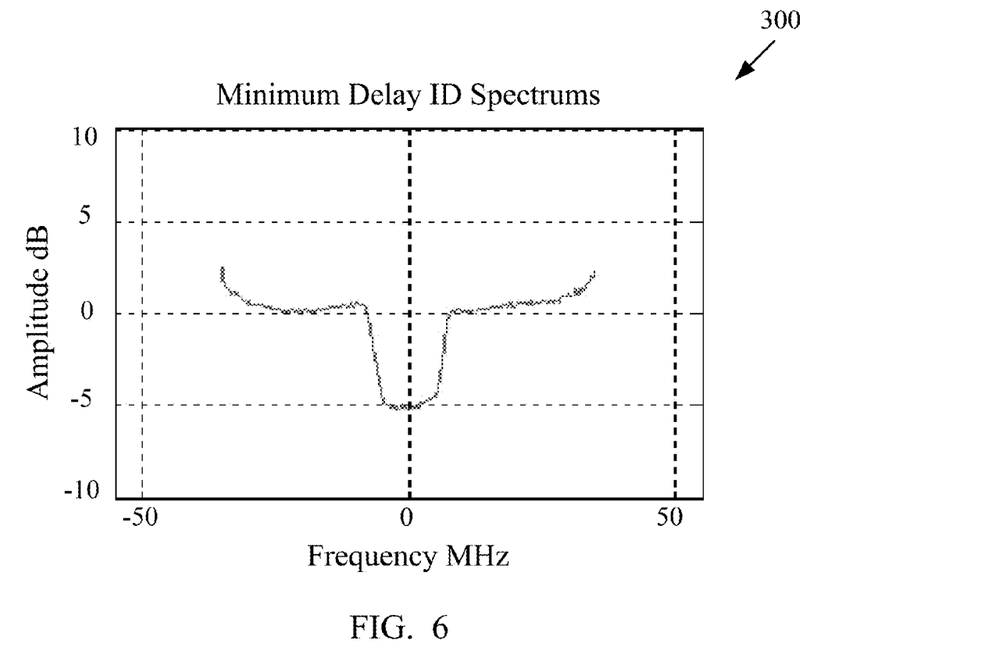
FIG. 6 shows a graph illustrating an example of an equalizing filter that may be used in the system shown in FIGS. 1 and 2.

While the hump from summing indicates that the parameters have been estimated and applied correctly, it is undesirable in the final wideband channel 121. For this reason, the summed result is equalized with an equalizing filter 120 as shown in FIGS. 1 and 2. This may be achieved by measuring the transfer function of each receive chain, combining them by adjusting the phase and delay (as described above), and taking the inverse of the spectrum. An example of an equalizing filter is shown in graph 300 of FIG. 6. Comparing FIG. 6 to FIG. 5, it may be seen that the equalizing filter aims to create a flat spectrum by removing the hump in the center of the band as well as eliminating the transfer function roll-off at the edges. FIG. 6 shows that the two transfer functions need not be symmetric, but may be arbitrary so long as they are known or can be measured.

The output 121 of equalizing filter 120 is the desired coherent wideband channel. The wideband channel generation may be applied in real-time or it may be accomplished after the data has been collected. Ideally, the transfer function of the coherent wideband channel generation will be flat across the spectrum so as to accurately represent the captured signals. The method above is described for two channels, but it may be readily extended to more than two channels. For example, a third channel might be overlapped with the second channel. In this case, the three channels would all be upsampled by a factor of about three (depending on the overlap bandwidth). After frequency modulation, the first and second channels would be aligned in delay, phase, and amplitude as shown in FIG. 4. Since these two channels are aligned, the second and third channels can now be adjusted in the same manner. Then, all three channels would be summed and equalized to create the final output. Alternatively, both the second and third channels can be aligned with the first in parallel to minimize latency at the expense of processing. In this manner it is possible to combine an arbitrarily large number of separate channels into a single coherent wideband channel.

The embodiments of the system and method described herein may be implemented using multiple narrowband receivers, which provides a cost advantageous alternative compared with using one wideband receiver. The system and method are flexible in that the channels may be used independently as narrowband channels or together as a single wideband channel.

In some embodiments, only a portion of the receivers (such as 2 of 3) may be used to create a wider bandwidth channel, and one channel may be used for narrowband processing. The disclosed system and method offer great fidelity because the resulting wideband channel is coherent and can be nearly indistinguishable from the channel out of a single wideband receiver. Also, the disclosed system and method do not rely on known transmitted signals, but instead may work with whatever signals are received by the antenna, even thermal noise. Further, each receiver may also have its own frequency reference since they do not have to be coherent. The phase offsets between the channels will be corrected in the alignment process.

The system and method may be implemented in hardware, such as an FPGA or ASIC, or in software, such as in a digital signal processor (DSP) or PC. In some embodiments, the separate channels may have coherent references, in which case the system and method only need to correct the delay and amplitude between the channels. Either of the channels can be delay, phase, and amplitude adjusted, or any combination, in reference to the other. For example, one channel might be phase adjusted, but the other channel is delayed in time and amplitude adjusted. The delay offset can also be further refined using, for example, curve-fitting, which would allow the time to be corrected to sub-sample accuracy. The cross-correlation and the filtering may be accomplished in the time domain or the frequency domain. The phase and delay estimate may be accomplished via cross-correlation or another method.

Figure 7:
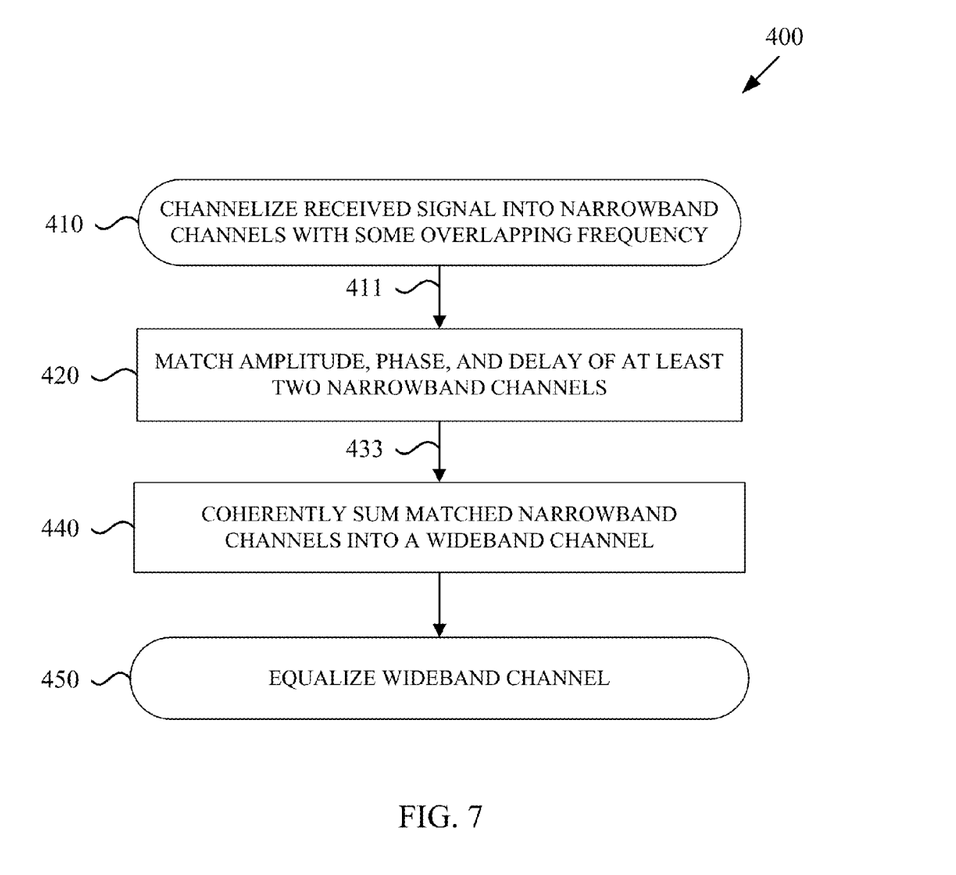
FIG. 7 shows a flowchart of an embodiment of a method in accordance with the System and Method for Coherent Wideband Channel Generation Using Multiple Received Narrowband Channels.

FIG. 7 shows a flowchart of an embodiment of a method 400 in accordance with the System and Method for Coherent Wideband Channel Generation Using Multiple Received Narrowband Channels. As an example, method 400 may be performed by system 10 as shown in FIGS. 1, 2, and 4 and will be discussed with reference thereto and its respective components. Further, while FIG. 7 shows one embodiment of method 400 to include steps 410-450, other embodiments of method 400 may contain fewer or more steps. Further, while in some embodiments the steps of method 400 may be performed as shown in FIG. 7, in other embodiments the steps may be performed in a different order, or certain steps may occur simultaneously with one or more other steps.

Step 410 involves channelizing a received signal, such as from antenna 20, into two or more narrowband channels, such as via receivers 30-60, such that each narrowband channel has an overlapping frequency portion. Method 400 proceeds along flow path 411 to step 420, which involves creating matched narrowband channels by matching the amplitude, phase, and delay of at least two of the narrowband channels, such as is performed by processor 70. Step 420 is discussed in more detail with respect to FIG. 8 below. Method 400 may then proceed along flow path 433 to step 440, which involves coherently summing, such as via summer 110, the matched narrowband channels into a wideband channel 111. Step 450 involves equalizing the wideband channel using an equalizing filter 120 to produce a coherent wideband channel 121.

Figure 8:
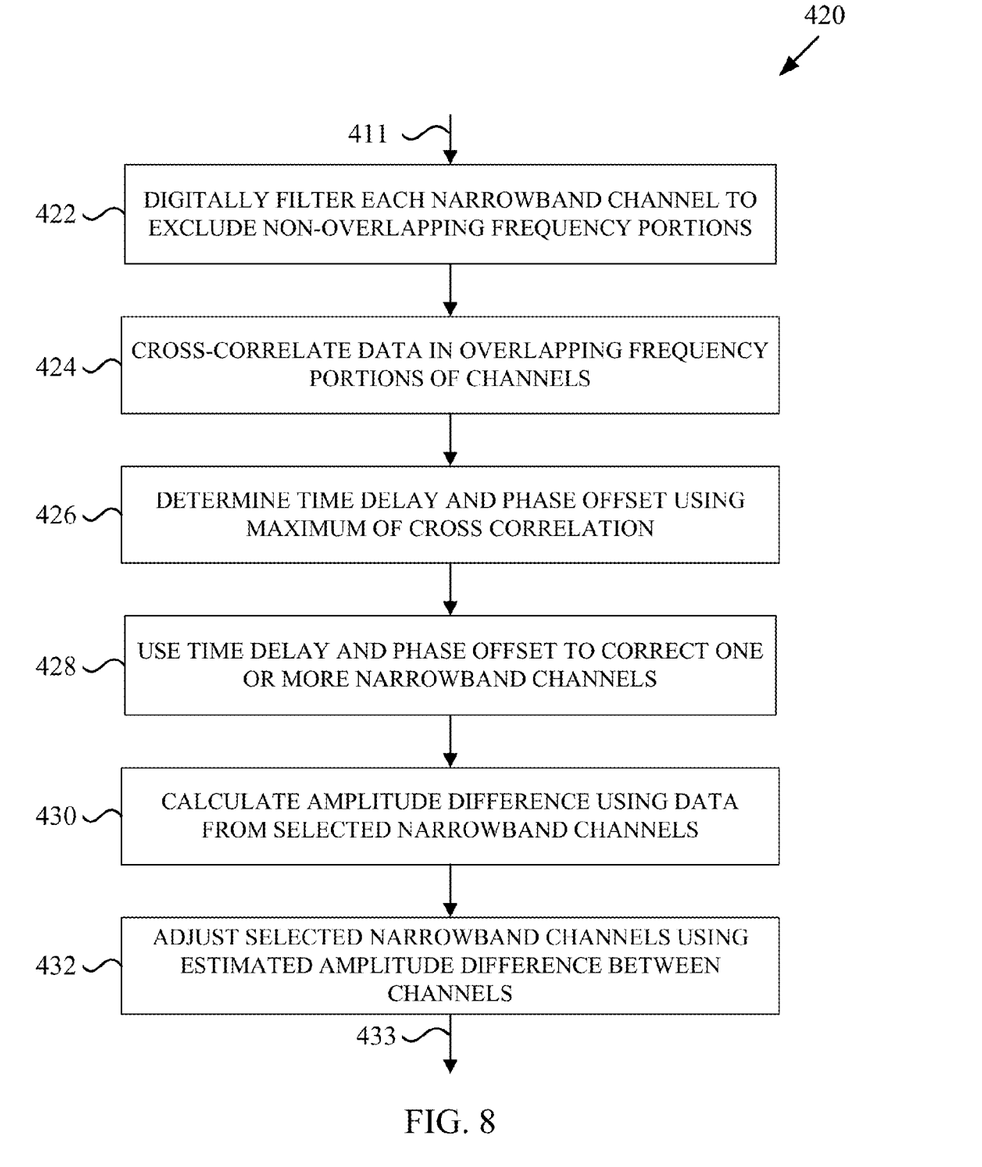
FIG. 8 shows a flowchart of an embodiment of a step for creating matched narrowband channels by matching the amplitude, phase, and delay of at least two narrowband channels.

FIG. 8 shows a flowchart of an embodiment of step 420 shown in FIG. 7. Generally, step 420 involves estimating the amplitude, delay, and phase differences between the narrowband channels and adjusting at least one of the narrowband channels using the estimated amplitude, delay, and phase differences between the narrowband channels. The estimation is performed in steps 422-430. Step 422 involves digitally filtering each narrowband channel, such as via LPF 82 and LPF 84, to exclude non-overlapping frequency portions of the narrowband channels. Step 424 involves cross-correlating the data from the narrowband channels in the overlapping frequency portion using circuitry 86.

Step 426 involves determining a time delay and a phase offset using the maximum of the cross-correlation determined by cross-correlation maximum circuitry 88, wherein the time delay is an offset of the maximum of the cross-correlation and the phase offset is the phase of the maximum of the cross-correlation. Step 428 involves using the time delay and the phase offset to correct one or more of the narrowband channels using circuitry 90. Step 430 involves using amplitude estimation circuitry 92 to calculate the amplitude difference by using data from each narrowband channel to be cross-correlated. Step 432 involves using amplitude, delay, and phase adjustment circuitry 100 to adjust at least one of the narrowband channels using the estimated amplitude difference between the narrowband channels.

Figure 9:
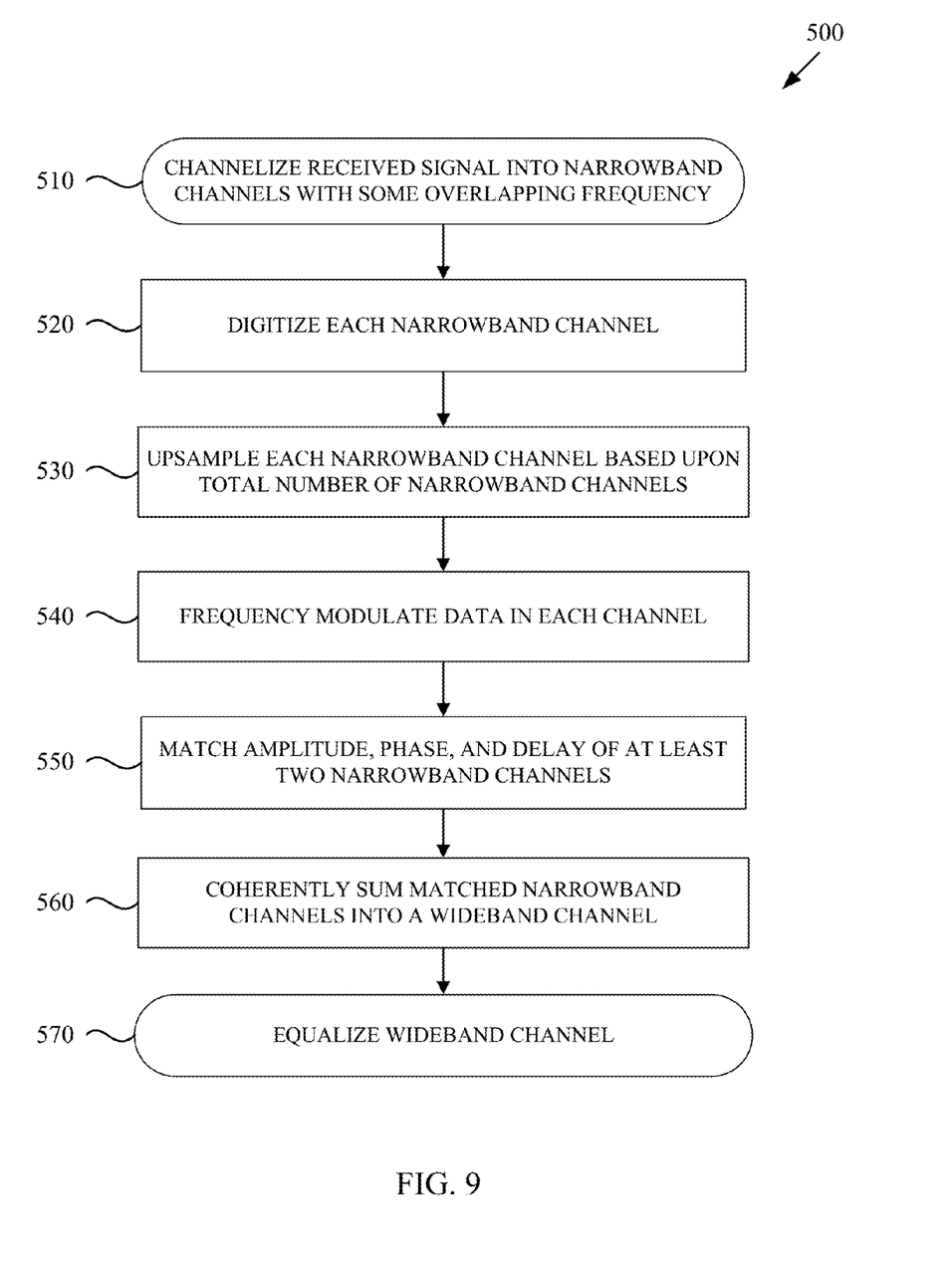
FIG. 9 shows a flowchart of another embodiment of a method in accordance with the System and Method for Coherent Wideband Channel Generation Using Multiple Received Narrowband Channels.

FIG. 9 shows a flowchart of another embodiment of a method 500 in accordance with the System and Method for Coherent Wideband Channel Generation Using Multiple Received Narrowband Channels. As an example, method 500 may be performed by system 10 as shown in FIGS. 1, 2, and 4 and will be discussed with reference thereto and its respective components. Further, while FIG. 9 shows one embodiment of method 500 to include steps 510-570, other embodiments of method 500 may contain fewer or more steps. Further, while in some embodiments the steps of method 500 may be performed as shown in FIG. 9, in other embodiments the steps may be performed in a different order, or certain steps may occur simultaneously with one or more other steps.

Step 510 involves channelizing a received signal, such as from antenna 20, into two or more narrowband channels, such as via receivers 30-60, such that each narrowband channel has an overlapping frequency portion. Step 520 involves digitizing each narrowband channel such as via ADCs 34 and 44. Step 530 involves upsampling, such as via circuitry 36 and 46, each narrowband channel by a factor dependent upon the number of narrowband channels. Step 540 involves frequency modulating data in each narrowband channel using modulation circuitry 38 and 48.

Step 550 involves creating matched narrowband channels by matching the amplitude, phase, and delay of at least two of the narrowband channels, such as is performed by processor 70. In some embodiments, step 550 may be performed similarly to step 420 shown in FIG. 8. Step 560 involves coherently summing, such as via summer 110, the matched narrowband channels into a wideband channel 111. Step 570 involves equalizing the wideband channel using an equalizing filter 120 to produce a coherent wideband channel 121.

Some or all of the steps of methods 400 and 500 may be stored on a non-transitory computer readable storage medium, wherein the steps are represented by computer readable programming code. The steps of methods 400 and 500 may also be computer-implemented using a programmable device, such as a computer-based system. Methods 400 and 500 may comprise instructions that, when loaded into a computer-based system, cause the system to execute the steps of methods 400 and 500. Methods 400 and 500 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the System and Method for Coherent Wideband Channel Generation Using Multiple Received Narrowband Channels are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
channelizing a received signal into two or more narrowband channels, each narrowband channel having an overlapping frequency portion;
estimating the amplitude, delay, and the phase difference between the narrowband channels; and
adjusting at least one of the narrowband channels using the estimated amplitude, delay, and phase differences between the narrowband channels;
coherently summing the matched narrowband channels into a wideband channel; and
equalizing the wideband channel using an equalizing filter.

2. The method of claim 1 further comprising the steps of, prior to the step of creating matched narrowband channels:
digitizing each narrowband channel;
upsampling each narrowband channel by a factor dependent upon the number of narrowband channels; and
frequency modulating data in each narrowband channel.

3. The method of claim 2, wherein the data in each narrowband channel comprises time domain data, wherein the step of frequency modulating data in each narrowband channel comprises frequency modulating the time domain data by multiplying the time domain data with a complex exponential with one of increasing phase or decreasing phase determined by a phase accumulator.

4. The method of claim 2, wherein the data in each narrowband channel comprises frequency domain data, wherein the step of frequency modulating data in each narrowband channel comprises circularly shifting the frequency domain data.

5. The method of claim 1, wherein the step of estimating the amplitude, delay, and phase differences between the narrowband channels comprises the steps of:
digitally filtering each narrowband channel to exclude non-overlapping frequency portions of the narrowband channels;
cross-correlating the data from the narrowband channels in the overlapping frequency portion;
determining a time delay and a phase offset using the maximum of the cross-correlation, wherein the time delay is the offset of the maximum of the cross-correlation and the phase offset is the phase of the maximum of the cross-correlation;
using the time delay and the phase offset to correct one or more of the narrowband channels; and calculating the amplitude difference by using data from each narrowband channel that was cross-correlated.

6. The method of claim 5, wherein the steps of digitally filtering each narrowband channel and cross-correlating the data from the narrowband channels occurs in the time domain.

7. The method of claim 5, wherein the steps of digitally filtering each narrowband channel and cross-correlating the data from the narrowband channels occurs in the frequency domain.

8. The method of claim 1, wherein the step of adjusting at least one of the narrowband channels comprises adjusting the phase and amplitude of one of the narrowband channels.

9. The method of claim 1, wherein the step of adjusting at least one of the narrowband channels comprises adjusting one of the phase, delay, and amplitude of one of the narrowband channels.

10. The method of claim 1, wherein the two or more narrowband channels comprises at least a first narrowband channel and a second narrowband channel, wherein the amplitude difference is calculated according to the equation $$\text{gain\_diff}_i = \frac{\text{sum}[\text{abs}(r1_{i,lpf}) - \text{mean}(r1_{i,lpf})]}{\text{sum}[\text{abs}(r2_{i,lpf}) - \text{mean}(r2_{i,lpf})]},$$

i=0, 1, 2, 3, 4, where r1 is the data from the first narrowband channel, r2 is the data from the second narrowband channel, and i is the segment number denoting adjacent and non-overlapping segments of data.

11. A method comprising the steps of:
dividing an analog signal received from a common feed source into two or more narrowband channels, wherein each narrowband channel has an overlapping frequency portion;
digitizing each narrowband channel;
upsampling each narrowband channel by a factor dependent upon the number of narrowband channels;
frequency modulating data in each narrowband channel;
estimating the amplitude, delay, and phase differences between the narrowband channels;
adjusting at least one of the narrowband channels using the estimated amplitude, delay, and phase differences between the narrowband channels;
coherently summing the narrowband channels into a wideband channel; and
equalizing the wideband channel using an equalizing filter.

12. The method of claim 11, wherein the step of estimating the amplitude, delay, and phase differences between the narrowband channels comprises the steps of:
digitally filtering each narrowband channel to exclude non-overlapping frequency portions of the narrowband channels;
cross-correlating the data from the narrowband channels in the overlapping frequency portion;
determining a time delay and a phase offset using the maximum of the cross-correlation, wherein the time delay is the offset of the maximum of the cross-correlation and the phase offset is the phase of the maximum of the cross-correlation;
using the time delay and the phase offset to correct one or more of the narrowband channels; and
calculating the amplitude difference by using data from each narrowband channel to be cross-correlated.

13. The method of claim 11, wherein the two or more narrowband channels comprises at least a first narrowband channel and a second narrowband channel, wherein the amplitude difference is calculated according to the equation $$\text{gain\_diff}_i = \frac{\text{sum}[\text{abs}(r1_{i,lpf}) - \text{mean}(r1_{i,lpf})]}{\text{sum}[\text{abs}(r2_{i,lpf}) - \text{mean}(r2_{i,lpf})]},$$

i=0, 1, 2, 3, 4, where r1 is the data from the first narrowband channel, r2 is the data from the second narrowband channel, and i is the segment number denoting adjacent and non-overlapping segments of data.

14. The method of claim 11, wherein the steps of digitally filtering each narrowband channel and cross-correlating the data from the narrowband channels occurs in one of the time domain and the frequency domain.

15. The method of claim 11, wherein the step of adjusting at least one of the narrowband channels comprises adjusting one of the phase, delay, and amplitude of one of the narrowband channels.

16. The method of claim 11, wherein the data in each narrowband channel comprises time domain data, wherein the step of frequency modulating data in each narrowband channel comprises frequency modulating the time domain data by multiplying the time domain data with a complex exponential with one of increasing phase and decreasing phase determined by a phase accumulator.

17. The method of claim 11, wherein the data in each narrowband channel comprises frequency domain data, wherein the step of frequency modulating data in each narrowband channel comprises circularly shifting the frequency domain data.

18. A system comprising:
at least two narrowband channels operatively connected to an antenna, each narrowband channel comprising a low-noise amplifier (LNA), an analog-to-digital (A/D) converter operatively connected to the LNA, and a frequency modulator operatively connected to the A/D converter;
first circuitry configured to perform amplitude, phase, and delay estimation on the narrowband channel signals, the first circuitry operatively connected to the frequency modulator of each of the narrowband channels;
second circuitry configured to perform amplitude, phase, and delay adjustment on the narrowband channel signals, the second circuitry operatively connected to the first circuitry;
a summer operatively connected to the frequency modulator of each of the narrowband channels, the first circuitry, and the second circuitry, configured to coherently sum the narrowband channels into a wideband channel; and
an equalizing filter, operatively connected to the summer, configured to equalize the wideband channel.

19. The system of claim 18, wherein the first circuitry comprises:
a first filter operatively connected to the frequency modulator of a first narrowband channel of the at least two narrowband channels;
a second filter operatively connected to the frequency modulator of a second narrowband channel of the at least two narrowband channels;
cross-correlation circuitry operatively connected to the first filter and the second filter;
cross-correlation maximum circuitry, operatively connected to the cross-correlation circuitry, configured to determine the maximum of the cross-correlation;

delay and phase adjustment circuitry operatively connected to the second filter and the cross-correlation maximum circuitry; and amplitude estimation circuitry operatively connected to the first filter and the second filter and the delay and phase adjustment circuitry.

\* \* \* \* \*